(12) United States Patent
Wang et al.

(10) Patent No.: US 11,051,027 B2
(45) Date of Patent: Jun. 29, 2021

(54) INTRA-FRAME AND INTER-FRAME COMBINED PREDICTION METHOD FOR P FRAMES OR B FRAMES

(71) Applicant: PEKING UNIVERSITY SHENZHEN GRADUATE SCHOOL, Shenzhen (CN)

(72) Inventors: Ronggang Wang, Shenzhen (CN); Kui Fan, Shenzhen (CN); Ge Li, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 0 days.

(21) Appl. No.: 16/629,777

(22) PCT Filed: Sep. 25, 2018

(86) PCT No.: PCT/CN2018/107210
§ 371 (c)(1),
(2) Date: Jan. 9, 2020

(87) PCT Pub. No.: WO2019/119910
PCT Pub. Date: Jun. 27, 2019

(65) Prior Publication Data
US 2020/0314432 A1 Oct. 1, 2020

(30) Foreign Application Priority Data
Dec. 20, 2017 (CN) .......................... 201711381157.3

(51) Int. Cl.
*H04N 19/159* (2014.01)
*H04N 19/176* (2014.01)
(Continued)

(52) U.S. Cl.
CPC ......... *H04N 19/159* (2014.11); *H04N 19/147* (2014.11); *H04N 19/149* (2014.11); *H04N 19/172* (2014.11); *H04N 19/176* (2014.11)

(58) Field of Classification Search
None
See application file for complete search history.

(56) References Cited

U.S. PATENT DOCUMENTS 9,609,343 B1 * 3/2017 Chen .................... H04N 19/159

FOREIGN PATENT DOCUMENTS

CN        101877785      * 11/2010
CN        101877785 A    11/2010
(Continued)

*Primary Examiner* — Matthew K Kwan
(74) *Attorney, Agent, or Firm* — Miles & Stockbridge P.C.

(57) ABSTRACT

An intra-frame and inter-frame combined prediction method for P frames or B frames. The method comprises: self-adaptively selecting by means of a rate-distortion optimization (RDO) decision whether to use the intra-frame and inter-frame combined prediction or not; using a method for weighting an intra prediction block and an inter prediction block in the intra-frame and inter-frame combined prediction to obtain a final prediction block; and obtaining the weighting coefficient of the intra prediction block and the inter prediction block according to prediction distortion statistics of the prediction method. Therefore, prediction precision can be improved, and coding and decoding efficiency of the prediction blocks are improved. The advantages of intra prediction and inter prediction are fully utilized in the present invention; and the optimal prediction parts of the two methods are selected to be combined, so that to a certain extent, areas with excessive distortion can be removed out of the intra prediction block and the inter prediction block, thus obtaining a better prediction effect and achieving excellent practicality and robustness.

8 Claims, 3 Drawing Sheets

(51) Int. Cl.
 *H04N 19/147* (2014.01)
 *H04N 19/172* (2014.01)
 *H04N 19/149* (2014.01)

(56) References Cited

FOREIGN PATENT DOCUMENTS

| CN | 107113425 | * | 8/2017 |
| CN | 107113425 A | | 8/2017 |
| CN | 107995489 A | | 5/2018 |

* cited by examiner

INTRA-FRAME AND INTER-FRAME COMBINED PREDICTION METHOD FOR P FRAMES OR B FRAMES

CROSS-REFERENCE TO RELATED APPLICATIONS

The present application is a national stage filing under 35 U.S.C. § 371 of PCT/CN2018/107210, filed on Sep. 25, 2018 which claims priority to CN Application No. 201711381157.3 filed on Dec. 20, 2017. The applications are incorporated herein by reference in their entirety.

FIELD

The present disclosure generally relates to a field of video coding, specifically relates to a prediction method for inter prediction frame (i.e., P frames or B frames), which may combine an intra prediction block and an inter prediction block to gain a final prediction block, enhancing prediction accuracy and thereby improving coding efficiency.

BACKGROUND

In the field of video coding, intra prediction and inter prediction are very effective tools that can remove redundant information in video sequences. Specifically, inter prediction uses correlations between current frame and reference frame thereof to reduce temporal redundancy, while intra prediction uses the similarity between spatially adjacent pixels to eliminate spatial redundancy.

In coding standards of the prior art, intra prediction and inter prediction are independent of each other. Intra prediction may be used for intra prediction blocks in an intra prediction frame (I frame) or an inter prediction frame, while inter prediction may only be used for an inter prediction frame (a forward prediction frame (P frame) or a bidirectional prediction frame (B frame)).

Main shortcomings of the above prediction technology are:

Intra prediction and inter prediction are independent of each other in the present art, and the advantages and disadvantages of intra prediction and inter prediction are not comprehensively considered, and a proper one of them is selected only depending on decision of the encoder side, and it's unable to take advantage of the advantages of the two prediction methods, thereby limits the prediction performance to a certain extent.

SUMMARY

To overcome drawbacks in the existing technologies, the present disclosure provides an intra-frame and inter-frame combined prediction method for P frames or B frames, to effectively reduce distortion of prediction blocks, and improve prediction precision of the prediction blocks.

The technical solutions provided by the present application are as follows:

An intra-frame and inter-frame combined prediction method for P frames or B frames. Self-adaptively select by means of a rate-distortion optimization (RDO) decision whether to use the method or not. The prediction method of the present application obtains a final prediction block by weighting an intra prediction block and an inter prediction block. Wherein, weighting coefficients of the intra prediction block and the inter prediction block are obtained according to prediction distortion statistics of the two kinds of prediction methods. Therefore, prediction precision can be improved, and coding efficiency of the prediction blocks can be improved. The method comprises the following steps:

1) On the encoder side, performing rate-distortion optimization on each coding unit (CU) as following steps:
   11) Firstly, performing intra prediction on a coding unit (CU);
   12) Then, performing inter prediction on the coding unit (CU);
   13) Calculating weighted average of the intra prediction block and the inter prediction block, to obtain an intra-frame and inter-frame combined prediction block;
   14) Determining whether to use the intra-frame and inter-frame combined prediction method by means of a RDO decision; a 1-bit flag is transmitted to a bitstream in each coding unit to mark whether the intra-frame and inter-frame combined prediction method is used;
   15) Writing inter prediction information into the bitstream, if the intra-frame and inter-frame combined prediction method is used.

In the intra-frame and inter-frame combined prediction, the inter prediction information will be used to obtain inter prediction blocks. When different inter prediction modes are used, different inter prediction information will be transmitted. If motion information of the inter prediction mode used in the intra-frame and inter-frame combined prediction is obtained by deriving, only syntax elements related to the derivation of the inter information need be transmitted. If the motion information of the inter prediction mode used in the intra-frame and inter-frame combined prediction is obtained through motion estimation, the corresponding motion information needs to be transmitted. In the intra-frame and inter-frame combined prediction, a completely new inter prediction mode can also be defined for combining with intra prediction blocks, as long as the corresponding inter prediction information has been transmitted to the decoder side.

2) On the decoder side, for a coding unit, reading the 1-bit flag in the bitstream and decoding it according to the flag. The following steps are performed:
   21) Firstly, for the coding unit (CU), performing intra prediction;
   22) Determining whether to use the intra-frame and inter-frame combined prediction method or not on the decoder side according to the 1-bit flag read from the bitstream;
   23) If the intra-frame and inter-frame combined prediction method is used, performing the following steps: Firstly, read the inter prediction information from the bitstream and perform inter prediction on the coding unit, so as to obtain an intra-frame and inter-frame combined prediction block. Finally, perform reconstruction of the current coding block (the intra-frame and inter-frame combined prediction block).
   24) If the intra-frame and inter-frame combined prediction method is not used, reconstruction of the coding block is performed directly.

The core of the present application includes a process of combining an intra prediction block and an inter prediction block, as shown in Formula 1:

$$P'_{comb}(x,y) = W_{intra}(x,y) \cdot P_{intra}(x,y) + (1 - W_{intra}(x,y)) \cdot P_{inter}(x,y) \quad 0 \le x,y < N \qquad \text{Formula 1}$$

wherein $P_{intra}(x,y)$ is a pixel value of the intra prediction block and $P_{inter}(x,y)$ is a pixel value of the inter prediction block, and Wintra (x, y) is a weighting coefficient for the intra prediction pixel value. $P'_{comb}(x,y)$ is a pixel value of a weighted combination of intra prediction and inter prediction; x, y are coordinates of the prediction blocks, x=0 represents the first column of the prediction block, y=0 represents the first row of the prediction block. N represents the size of the current prediction block.

In the intra-frame and inter-frame combined prediction method of the present application, weighting coefficients are designed according to the magnitude of distortions of intra prediction and inter prediction, and the weighting coefficients are inversely proportional to the distortions of prediction blocks, and the distortions of the prediction blocks are obtained by statistic.

Compared with the prior art, the present disclosure has the following beneficial effects:

The application provides a prediction method combining intra prediction and inter prediction, which can reduce the overall distortion of a prediction block, improve prediction precision, and thereby improve coding efficiency of the prediction block. Specifically, the technical advantages of the present invention are reflected in the following aspects:

In the present application, it determines by means of a RDO decision whether to use the intra-frame and inter-frame combined prediction method or not. Since not all prediction blocks are suitable to be predicted by using the intra-frame and inter-frame combined prediction, using a RDO decision improves practicality and robustness of the technical solutions.

In addition, the present application proposes to use the weighting coefficients which are inversely proportional to distortions of the prediction blocks. The method can take advantages of intra prediction and inter prediction, and the optimal prediction parts of the two methods are selected to be combined, thus, to a certain extent, areas with excessive distortion in the intra prediction block and the inter prediction block can be removed, so as to obtain a better prediction effect.

DETAILED DESCRIPTION OF EMBODIMENTS

Hereinafter, the present disclosure is further described through the embodiments, but the scope of the present disclosure is not limited in any manner.

The present disclosure provides an effective intra-frame and inter-frame combined prediction method, and adaptively determines whether to use it or not by means of a RDO decision. The proposed intra-frame and inter-frame combined prediction method obtains a new prediction block by means of weighting an intra prediction block and an inter prediction block. Weighting coefficients that have been used were determined according to intra-frame and inter-frame prediction distortion statistics, and are inversely proportional to the corresponding distortion statistics of prediction blocks. The invention can resolve distortion of the prediction blocks, and prediction precision and encoding efficiency of prediction blocks can be improved.

Figure 1:
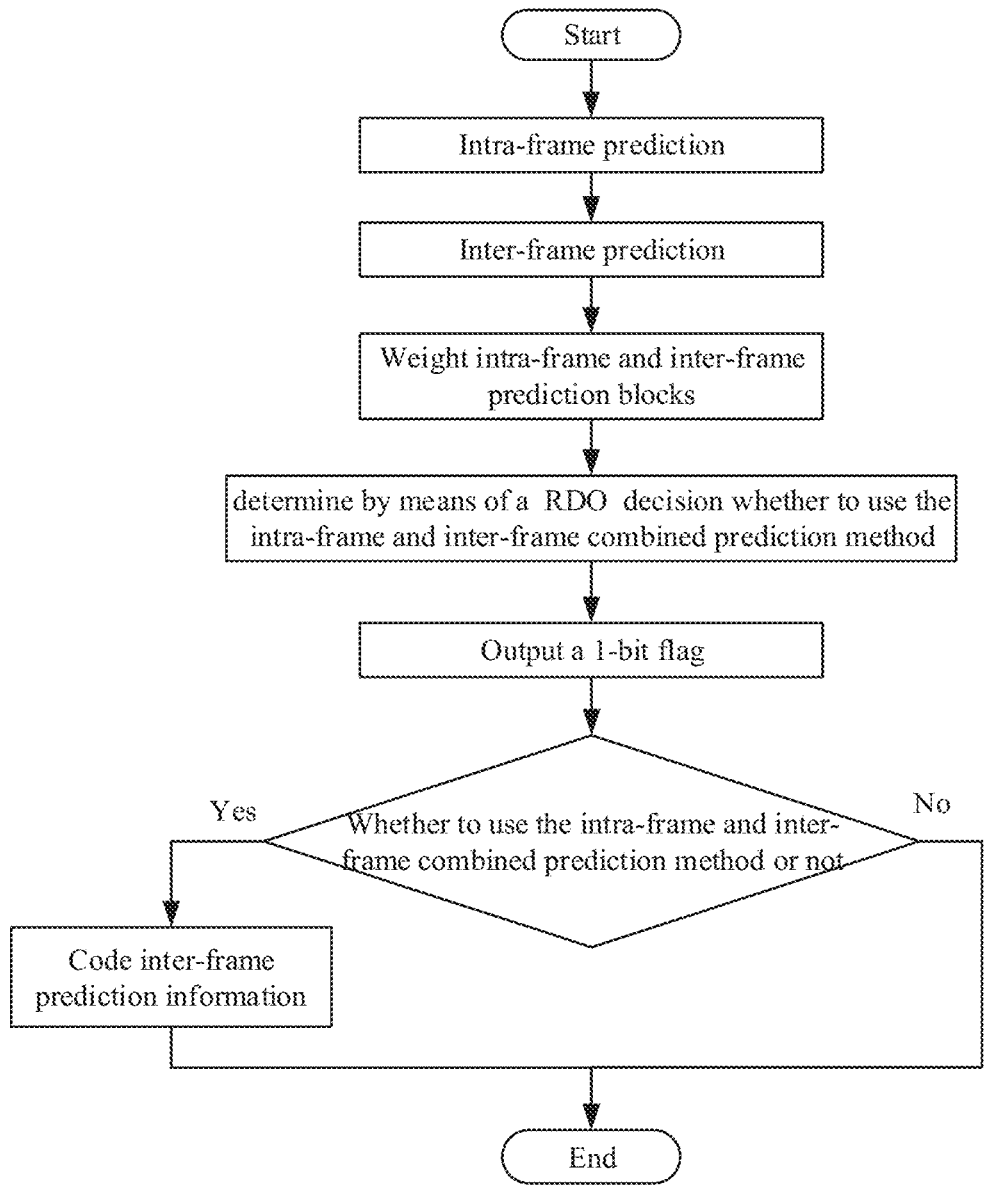
FIG. 1 is a flowchart of encoding of a coding unit (CU) of the present application.

FIG. 1 is a flowchart of encoding on the encoder side of the present application. For a coding unit, firstly perform intra prediction and inter prediction. Then, calculate weighted average of an intra prediction block and an inter prediction block to obtain an intra-frame and inter-frame combined prediction block. After that, determine whether to use the intra-frame and inter-frame combined prediction method or not by means of a rate-distortion optimization decision, and output a 1-bit flag into the bitstream. If the intra-frame and inter-frame combined prediction method is used, code the used inter prediction information into a bitstream.

Figure 2:
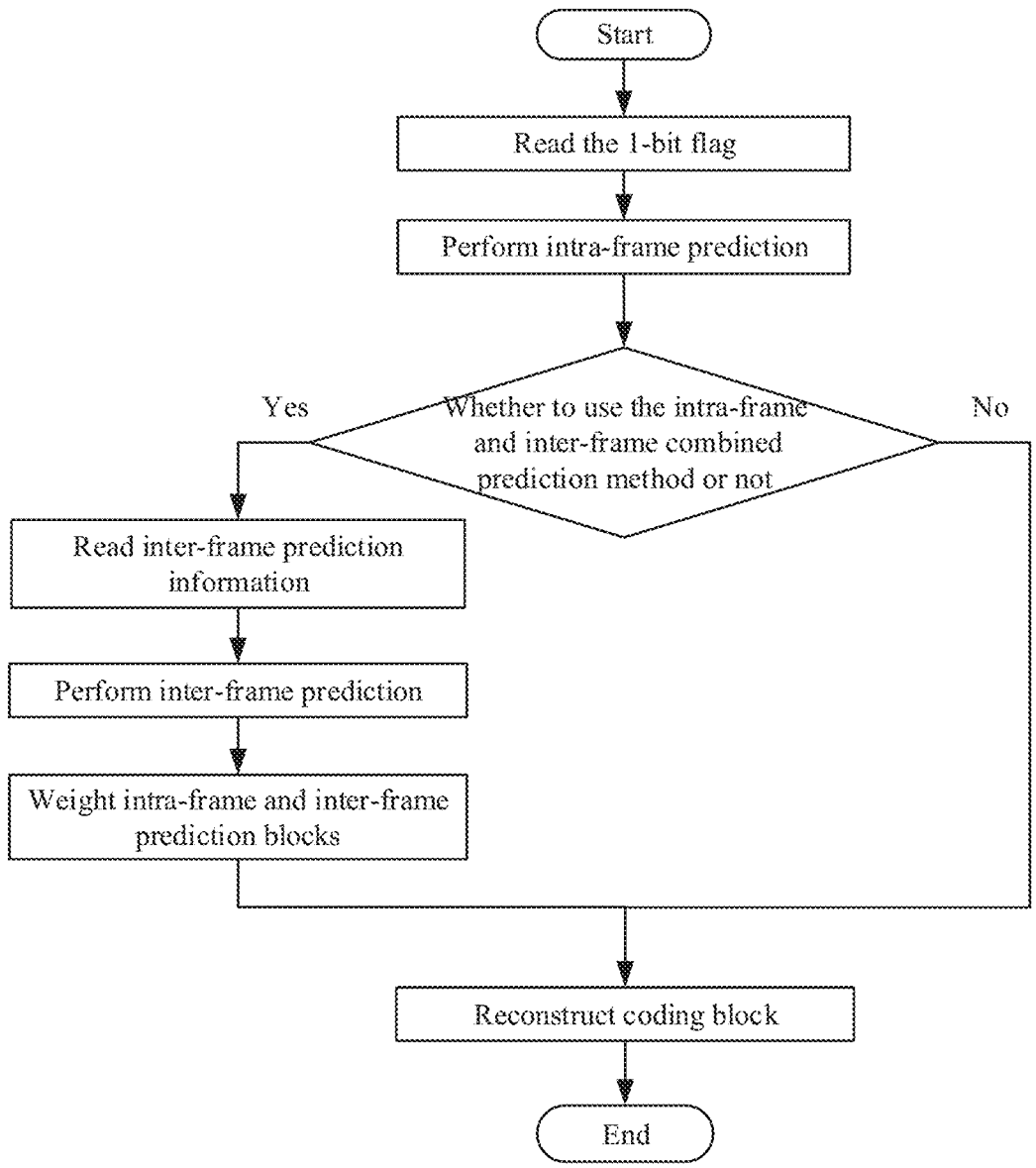
FIG. 2 is a flowchart of decoding of a coding unit (CU) of the present application.

FIG. 2 is a flowchart of decoding on the decoder side of the present application. For a coding unit, firstly read the 1-bit flag. Then, perform intra prediction. According to the value of the flag, determine whether to use the intra-frame and inter-frame combined prediction method or not. If the intra-frame and inter-frame combined prediction method is not used, reconstruction of the coding block may be performed directly. Otherwise, read the inter prediction information from the bitstream and perform inter prediction on the coding unit (CU), then calculate weighted average of an intra prediction block and an inter prediction block to obtain an intra-frame and inter-frame combined prediction block. Finally, perform reconstruction of the current coding block.

The weight coefficients in the intra-frame and inter-frame combined prediction method proposed by the present application are designed according to intra-frame and and inter-frame prediction distortion, wherein the distortions of the prediction blocks are obtained by statistic, and the weight coefficients are inversely proportional to distortion statistics of prediction blocks. The determining of the weight coefficients are as follows:

Firstly, statistic of the prediction distortion distribution of each intra prediction mode is gathered and recorded as $D_{intra}(x, y)$, and statistic of the prediction distortion of the inter prediction block is gathered and recorded as $D_{inter}(x, y)$. Therefore, in the intra-frame and inter-frame combined prediction, weighting coefficients of the intra prediction block and the inter prediction block can be expressed as Formula 2 and Formula 3, respectively, and the sum of them is 1.

$$W_{intra}(x, y) = \frac{D_{inter}(x, y)}{D_{intra}(x, y) + D_{inter}(x, y)} \quad \text{Formula 2}$$

$$W_{inter}(x, y) = \frac{D_{intra}(x, y)}{D_{intra}(x, y) + D_{inter}(x, y)} \quad \text{Formula 3}$$

Wherein, $W_{intra}(x, y)$ and $W_{inter}(x, y)$ are the weighting coefficients of the intra prediction block and the inter prediction block, respectively, and x and y are coordinates of the pixels in the prediction blocks.

By gathering statistic of coding results, a set of weighting coefficients can be generated for each size of prediction block and for each intra prediction mode. In addition, considering that distortion of the prediction blocks may be different in P frames and B frames, weighting coefficients for P frames and B frames need to be designed separately.

Figure 3:
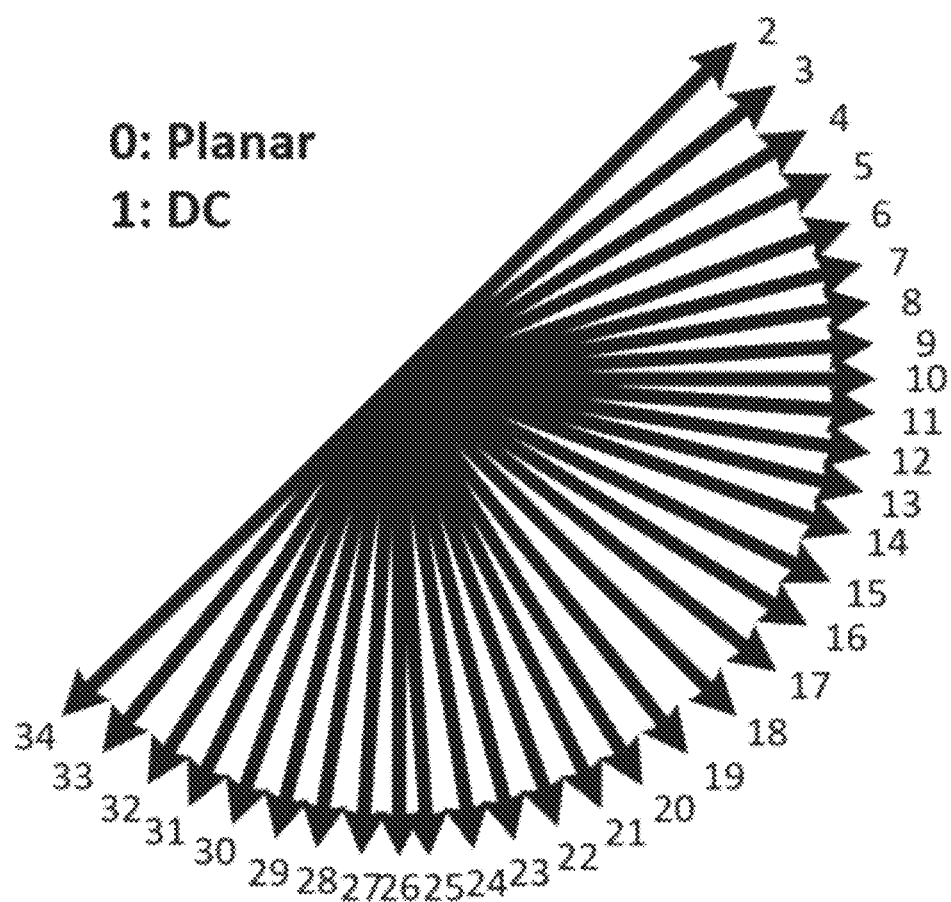
FIG. 3 is a schematic diagram of intra prediction modes in HEVC.

In order to save space for storing the weighting coefficients, the weighting coefficients can be simplified. For example, in the present application, intra prediction blocks may be divided into four groups based on intra prediction modes. Take HEVC intra prediction mode as an example, as shown in FIG. 3. Wherein, the first group includes modes 0 and 1, the second group includes modes 2-13, the third group includes modes 14-22, and the fourth group includes modes 23-34. A set of weighting coefficients is designed for each group.

Figure 4:
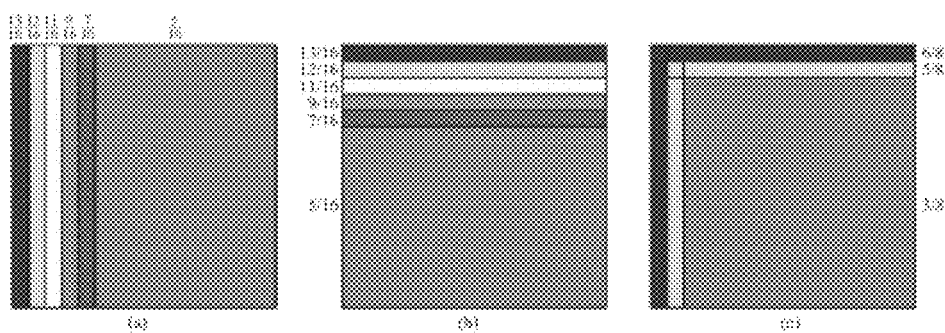
FIG. 4 is a schematic diagram of weighting coefficients in units of rows or columns in a 16×16 intra-frame and inter-frame combined prediction block in a specific embodiment of the present application.

In addition, in order to further save space for storing the weighting coefficients, weighting coefficients in units of rows or columns can be used, that is, a row or a column of pixels in a prediction block may correspond to a same weighting coefficient. For example, in HEVC, weighting coefficients in units of rows or columns can be designed for each of the above four groups of intra prediction modes. FIG. 4 shows the weighting coefficients in units of rows or columns designed for a 16×16 intra prediction block of the B frames. In FIG. 4, (A), (b), and (c) are weighting coefficients of the second group, the third group, and the fourth group of intra prediction blocks, respectively. And, the intra prediction blocks in the first group directly use ½ as the weighting coefficient for the combination of prediction blocks.

To avoid floating-point arithmetic, the floating-point weighting coefficients proposed in the present application may be converted into integers, and a right shift operation may be performed after weighting. Specifically, the weighting coefficient can be multiplied by the m-th power of 2, and the predicted value may be shifted to the right by m bits after weighted calculation. After been converted into integer arithmetic, Formula 1 is shown as Formula 4. The value of m relates to required computational accuracy. The higher is the required accuracy, the larger is the value of m and the more accurate is the calculation result.

$$P'_{comb}(x,y)=(2^m \cdot W_{intra}(x,y) \cdot P_{intra})(x,y)+(2^m-2^m \cdot W_{intra}(x,y)) \cdot P_{inter}(x,y)+2^{m-1}) >> m \quad \text{Formula 4}$$

In the intra-frame and inter-frame combined prediction, the inter prediction information will be used to obtain the inter prediction blocks. When different inter prediction modes are used, different inter prediction information will be transmitted. If motion information of the inter prediction mode used in the intra-frame and inter-frame combined prediction is obtained by deriving, such as a skip mode and a merge mode in HEVC, only syntax elements related to the derivation of the inter information need be transmitted. Specifically, if the skip mode is used in the intra-frame and inter-frame combined prediction, the skip mode information, that is, the index of candidate motion information of the skip mode, need to be transmitted; and if the merge mode is used, candidate index and residual information of the merge mode motion information need to be transmitted. If the motion information of the inter prediction mode used in the intra-frame and inter-frame combined prediction is obtained through motion estimation, the corresponding motion information needs to be transmitted. In the intra-frame and inter-frame combined prediction, a completely new inter prediction mode can also be defined for combining with intra prediction blocks, as long as the corresponding inter prediction information has been transmitted to the decoder side. For example, the first candidate motion information of the skip mode can be used invariably, and since the invariant inter prediction mode is used, there is no need to transmit any inter prediction information to the decoder side.

It needs to be noted that the embodiments as disclosed are intended to facilitating further understanding of the present disclosure; however, those skilled in the art may understand that various substitutions and modifications are possible without departing from the spirit and scope of the present disclosure. Therefore, the present disclosure should not be limited to the contents disclosed in the embodiments, but should be governed by the appended claims.

We claim:

1. An intra-frame and inter-frame combined prediction encoding method, comprising: self-adaptively selecting by means of a rate-distortion optimization decision whether to use the intra-frame and inter-frame combined prediction or not; in the intra-frame and inter-frame combined prediction, obtaining a final prediction block by means of weighting an intra prediction block and an inter prediction block; and obtaining weighting coefficients of the intra prediction block and the inter predict ion block according to prediction distortion statistics of prediction methods;

for intra-frame and inter-frame combined prediction for P frames or B frames, firstly performing rate-distortion optimization on each coding unit on the encoder side, comprising:

11) performing intra prediction on a coding unit;

12) then, performing inter prediction on the coding unit;

13) calculating weighted average of the intra prediction block and the inter prediction block, to obtain an intra-frame and inter-frame combined prediction block;

14) determining by means of a rate-distortion optimization decision whether to use the intra-frame and inter-frame combined prediction method or not; a combined prediction flag is transmitted to a bitstream in each coding unit to identify whether the intra-frame and inter-frame combined prediction method is used;

15) the intra-frame and inter-frame combined prediction method is expressed as Formula 1:

$$P'_{comb}(x,y)=W_{intra}(x,y) \cdot P_{intra}(x,y)+(1-W_{intra}(x,y)) \cdot P_{inter}(x,y) \quad 0 \leq x,y < N \quad \text{Formula 1}$$

wherein, $P_{intra}(x,y)$ is a pixel value of the intra prediction block and $P_{inter}(x,y)$ is a pixel value of the inter prediction block, and $W_{intra}(x,y)$ is a weighting coefficient for the intra prediction pixel value; $P'_{comb}(x,y)$ is a pixel value of the weighted combination of intra prediction and inter prediction; x, y are coordinates of the prediction blocks, x=0 represents the first column of the prediction block, y=0 represents the first row of the prediction block; N represents the size of the current prediction block;

writing information about the inter prediction into the bitstream to complete the encoding process of intra-frame and inter-frame combined prediction, if the intra-frame and inter-frame combined prediction method is used;

wherein, different weighting coefficients are used according to the magnitude of the distortions of intra prediction and inter prediction, wherein the weighting coefficients are inversely proportional to the distortions of the prediction blocks; the distortions of the prediction blocks are obtained through statistics, and the specific statistical method is as follows:

getting prediction distortion distribution of each intra prediction mode by statistical analysis and record it as $D_{intra}(x, y)$;

getting prediction distortion of the inter prediction block by statistical analysis and record it as $D_{inter}(x, y)$;

in the intra-frame and inter-frame combined prediction, the sum of the weighting coefficients of the intra prediction block and the inter prediction block is 1, and the weighting coefficients of the intra prediction block and the inter prediction block are expressed as Formulas 2 and 3, respectively:

$$W_{intra}(x, y) = \frac{D_{inter}(x, y)}{D_{intra}(x, y) + D_{inter}(x, y)} \quad \text{Formula 2}$$

$$W_{inter}(x, y) = \frac{D_{intra}(x, y)}{D_{intra}(x, y) + D_{inter}(x, y)} \quad \text{Formula 3}$$

wherein, $W_{intra}(x\ y)$ and $W_{inter}(x\ y)$ are the weighting coefficients of the intra prediction block and the inter prediction block, respectively, and x and y are coordinates of the pixels in the prediction blocks;

for each size of prediction block and for each intra prediction mode, a set of weighting coefficients is generated; and different weighting coefficients are generated for P frames and B frames, respectively.

2. The intra-frame and inter-frame combined prediction encoding method of claim 1 wherein, the combined prediction flag is a 1-bit flag.

3. The intra-frame and inter-frame combined prediction encoding method of claim 1, wherein, simplify the weighting coefficients or use the weighting coefficients in units of rows or columns to save space for storing the weighting coefficients.

4. The intra-frame and inter-frame combined prediction encoding method of claim 1, wherein, to avoid floating-point arithmetic, convert floating-point weighting coefficients into integers and perform right shift operations after weighting; the weighting coefficient is multiplied by the m-th power of 2, and the predicted value is shifted to the right by m bits after weighted calculation, and after been converted into integer arithmetic, Formula 1 is shown as Formula 4:

$$P'_{comb}(x,y) = (2^m \cdot W_{intra}(x,y) \cdot P_{intra}(x,y) + (2^m - 2^m \cdot W_{intra}(x,y)) \cdot P_{inter}(x,y) + 2^{m-1}) >> m \quad \text{Formula 4}$$

wherein, the value of m relates to computational accuracy, and the higher is the required accuracy, the larger is the value of m and the more accurate is the calculation result.

5. A intra-frame and inter-frame combined prediction decoding method, self-adaptively selecting by means of a rate-distortion optimization decision whether to use the intra-frame and inter-frame combined prediction or not; in the intra-frame and inter-frame combined prediction, obtaining a final prediction block by means of weighting an intra prediction block and an inter prediction block; and obtaining weighting coefficients of the intra prediction block and the inter prediction block according to prediction distortion statistics of prediction methods;

for intra-frame and inter-frame combined prediction for P-frames or B-frames, on the decoder side, reading a combined prediction flag in a bitstream for each coding unit, and decoding according to the flag; performing the following steps:
21) performing intra prediction on the coding unit;
22) determining whether to use the intra-frame and inter-fra me combined prediction method or not on the decoder side according to the combined prediction flag read from the bitstream;
23) if the intra-frame and inter-frame combined prediction method is used, performing the following steps: firstly, reading inter prediction information from the bitstream and perform inter prediction on the coding unit, then calculating weighted average of the intra prediction block and the inter prediction block, so as to obtain an intra-frame and inter-frame combined prediction block; finally, performing reconstruction of the current coding block;

the intra-frame and inter-frame combined prediction block is obtained by performing prediction according to Formula 1:

$$P'_{comb}(x,y) = W_{intra}(x,y) \cdot P_{intra}(x,y) + (1 - W_{intra}(x,y)) \cdot P_{inter}(x,y) \quad 0 \le x,y < N \quad \text{Formula 1}$$

wherein, $P_{intra}(x,y)$ is a pixel value of the intra prediction block and $P_{inter}(x,y)$ is a pixel value of the inter prediction block, and $W_{intra}(x,y)$ is a weighting coefficient for the intra prediction pixel value; $P'_{comb}(x,y)$ is a pixel value of the weighted combination of intra prediction and inter prediction; x, y are coordinates of the prediction blocks, x=0 represents the first column of the prediction block, y=0 represents the first row of the prediction block; N represents the size of the current prediction block;

if the intra-frame and inter-frame combined prediction method is not used, reconstructing the coding block directly;

wherein, different weighting coefficients are used according to the magnitude of the distortions of intra prediction and inter prediction, wherein the weighting coefficients are inversely proportional to the distortions of the prediction blocks; the distortions of the prediction blocks are obtained through statistics, and the specific statistical method is as follows:

getting prediction distortion distribution of each intra prediction mode by statistical analysis and record it as $D_{intra}(x, y)$;

getting prediction distortion of the inter prediction block by statistical analysis and record it as $D_{inter}(x, y)$;

in the intra-frame and inter-frame combined prediction, the sum of the weighting coefficients of the intra prediction block and of the inter prediction block is 1, and the weighting coefficients of the intra prediction block and the inter prediction block are expressed as Formulas 2 and 3, respectively:

$$W_{intra}(x, y) = \frac{D_{inter}(x, y)}{D_{intra}(x, y) + D_{inter}(x, y)} \quad \text{Formula 2}$$

$$W_{inter}(x, y) = \frac{D_{intra}(x, y)}{D_{intra}(x, y) + D_{inter}(x, y)} \quad \text{Formula 3}$$

wherein, $W_{intra}(x\ y)$ and $W_{inter}(x\ y)$ are the weighting coefficients of the intra prediction block and the inter prediction block, respectively, and x and y are coordinates of the pixels in the prediction blocks;

for each size of prediction block and for each intra prediction mode, a set of weighting coefficients is generated; and different weighting coefficients are generated for P frames and B frames, respectively.

6. The intra-frame and inter-frame combined prediction decoding method of claim 5 wherein, the combined prediction flag is a 1-bit flag.

7. The intra-frame and inter-frame combined prediction decoding method of claim 5, wherein, simplify the weighting coefficients or use the weighting coefficients in units of rows or columns to save space for storing the weighting coefficients.

8. The intra-frame and inter-frame combined prediction decoding method of claim 5, wherein, to avoid floating-point arithmetic, convert floating-point weighting coefficients into integers and perform right shift operations after weighting;

the weighting coefficient is multiplied by the m-th power of 2, and the predicted value is shifted to the right by m bits after weighted calculation, and after been converted into integer arithmetic, Formula 1 is shown as Formula 4:

$$P'_{comb}(x,y) = (2^m \cdot W_{intra}(x,y) \cdot P_{intra}(x,y) + (2^m - 2^m \cdot W_{intra}(x,y)) \cdot P_{inter}(x,y) + 2^{m-1}) >> m \qquad \text{Formula 4}$$

wherein, the value of m relates to computational accuracy, and the higher is the required accuracy, the larger is the value of m and the more accurate is the calculation result.

* * * * *